United States Patent
Akatsuka et al.

(10) Patent No.: US 10,457,594 B2
(45) Date of Patent: *Oct. 29, 2019

(54) CHEMICALLY STRENGTHENED GLASS

(71) Applicant: AGC INC., Tokyo (JP)

(72) Inventors: Kosho Akatsuka, Tokyo (JP); Satoshi Ogami, Tokyo (JP)

(73) Assignee: AGC INC., Tokyo (JP)

( * ) Notice: Subject to any disclaimer, the term of this patent is extended or adjusted under 35 U.S.C. 154(b) by 3 days.

This patent is subject to a terminal disclaimer.

(21) Appl. No.: 16/171,556

(22) Filed: Oct. 26, 2018

(65) Prior Publication Data
US 2019/0062204 A1  Feb. 28, 2019

Related U.S. Application Data

(63) Continuation of application No. 15/804,511, filed on Nov. 6, 2017, now Pat. No. 10,144,670, which is a (Continued)

(30) Foreign Application Priority Data

May 15, 2015 (JP) ................................ 2015-099687

(51) Int. Cl.
C03C 21/00 (2006.01)
C03C 3/085 (2006.01)
C03C 4/18 (2006.01)

(52) U.S. Cl.
CPC ............ C03C 21/002 (2013.01); C03C 3/085 (2013.01); C03C 4/18 (2013.01); C03C 2201/00 (2013.01)

(58) Field of Classification Search
CPC ....... C03C 23/00; C03C 3/085; C03C 21/002; C03C 4/18; C03C 2204/00; Y10T 428/315; Y10T 428/31; G06F 3/041
See application file for complete search history.

(56) References Cited

U.S. PATENT DOCUMENTS

| | | | |
|---|---|---|---|
| 2010/0035038 A1 | 2/2010 | Barefoot et al. | |
| 2011/0232945 A1* | 9/2011 | Whitcomb | C03C 17/007 174/254 |

(Continued)

FOREIGN PATENT DOCUMENTS

| | | |
|---|---|---|
| JP | 2011-530470 | 12/2011 |
| JP | 2014-028730 A | 2/2014 |

(Continued)

OTHER PUBLICATIONS

International Search Report dated Jun. 14, 2016 in PCT/JP2016/063769 filed May 9, 2016 (w/ English translation).

(Continued)

*Primary Examiner* — Humera N Sheikh
*Assistant Examiner* — Elizabeth D Ivey
(74) *Attorney, Agent, or Firm* — Oblon, McClelland, Maier & Neustadt, L.L.P.

(57) ABSTRACT

The present invention relates to a chemically strengthened glass, in which $CT_1$ and $CT_5$ satisfy $CT_5/CT_1 \leq 0.85$, the $CT_1$ satisfies $CT_1 > -38.7 \times \ln(t/1000) + 48.2$ [MPa] and an internal energy density rE satisfies $rE \leq 23.3 \times t/1000 + 15$ [kJ/m$^2$]. CS is a surface compressive stress value [MPa], $\sigma(x)$ is a compressive stress value [MPa] at a position x in a depth direction, DOL is a compressive stress depth [μm], and t is a sheet thickness [μm].

21 Claims, 8 Drawing Sheets

Related U.S. Application Data continuation of application No. PCT/JP2016/063769, filed on May 9, 2016.

(56)    References Cited

U.S. PATENT DOCUMENTS

| | | |
|---|---|---|
| 2012/0111057 A1 | 5/2012 | Barefoot et al. |
| 2012/0202040 A1 | 8/2012 | Barefoot et al. |
| 2013/0202868 A1 | 8/2013 | Barefoot et al. |
| 2013/0224492 A1* | 8/2013 | Bookbinder .......... C03C 21/002 428/410 |
| 2014/0370264 A1 | 12/2014 | Ohara et al. |
| 2016/0023944 A1 | 1/2016 | Bookbinder et al. |
| 2016/0368812 A1 | 12/2016 | Barefoot et al. |

FOREIGN PATENT DOCUMENTS

| | | |
|---|---|---|
| JP | 2015-511573 | 4/2015 |
| WO | WO 2013/065648 A1 | 5/2013 |
| WO | WO 2013/088856 A1 | 6/2013 |
| WO | WO 2013/130653 A2 | 9/2013 |
| WO | WO 2013/184205 A1 | 12/2013 |

OTHER PUBLICATIONS

Written Opinion dated Jun. 14, 2016 in PCT/JP2016/063769 filed May 9, 2016.

\* cited by examiner

CHEMICALLY STRENGTHENED GLASS

CROSS-REFERENCE TO RELATED APPLICATIONS

The present application is a continuation application of U.S. patent application Ser. No. 15/804,511 filed Nov. 6, 2017, which is a continuation application of International Application No. PCT/JP2016/063769, filed May 9, 2016, which claims priority to Japanese Patent Application No. 2015-099687, filed May 15, 2015. The contents of these applications are incorporated herein by reference in their entirety.

TECHNICAL FIELD

The present invention relates to a chemically strengthened glass.

BACKGROUND ART

A glass is often used in a display part and a case body in electronic devices such as a mobile phone and a smart phone, and to enhance strength of the glass, a so-called chemically strengthened glass having strength enhanced by forming a surface layer on a glass surface by ion exchange is used. The surface layer is a layer present on a glass surface side and having a refractive index distribution generated by ion exchange, contains at least a compressive stress layer having compressive stress generated therein, and may contain a tensile stress layer present in adjacent to the compressive stress layer at a glass inside side and having tensile stress generated therein. Strength of the chemically strengthened glass is determined by a stress value of a surface layer formed, a depth of a surface compressive stress layer, and the like.

In recent years, a chemically strengthened glass has small glass thickness for reducing its weight. Bending strength of a glass decreases with the decrease of sheet thickness. Therefore, it is necessary to further increase a surface stress value (CS value) in order to enhance bending strength. However, a tensile stress value (CT value) inside a glass increases with the progress of the decrease of sheet thickness and increase of CS, and there are possibilities that a glass finely scatters when collided with sufficient penetration force and fracture occurs from the inside of a glass when CT value further increases. To avoid danger of the fracture, the CT value is generally suppressed to equal to or lower than a CT value at which a glass, when broken, begins to finely scatter.

Patent Document 1 proposes a method of controlling strength of a strengthened glass by defining tensile stress CT inside a glass and adjusting CT value to a certain numerical range. In this method, tensile stress CT (unit: MPa) is calculated by the following formula (1). In the formula, CS is a surface stress value (MPa), DOL is a depth of a compressive stress layer (unit: μm), and t is a sheet thickness (unit: μm). The formula (1) is a limit value investigated in a chemically strengthened glass having a so-called complementary error function profile such that approximation to a linear function of a compressive stress profile inside a glass (hereinafter referred to as triangular approximation) can be relatively acceptable.

[Math. 1]

$$CT_1 = \frac{CS \times DOL}{(t - 2 \times DOL)} \quad (1)$$

In Patent Document 1, CT value is obtained from the formula (1), and a thickness function called nonlinear critical central tension $CT_{limit}$ is defined as "$CT_{limit}=-38.7\times\ln(t/1000)+48.2$" (formula (2)), is proposed as the upper limit of the CT value defined by the formula (1) and is used as a critical value of the beginning of unacceptable vulnerability.

Patent Document 2 proposes, in an ion-exchanged glass based on non-error functional compressive stress profile, a method of controlling strength of a strengthened glass by defining tensile stress CT inside the glass by a method different from the formula (1) and setting CT value to a certain numerical range. In this method, the total tensile stress CT (unit: MPa) is calculated by "$CT=(CS_1\times DOL_1)/(t-2\times DOL_1)+(CS_2\times DOL_2)/(t-2\times DOL_2)$" (formula (3)). Here, $CS_1$ is a surface stress value (MPa) that is the maximum of compressive stress positioned under the surface of a glass, $CS_2$ is a surface stress value (MPa), $DOL_1$ is a depth (unit: μm) of a compressive stress layer, $DOL_2$ is a depth (unit: μm) corresponding to $CS_1$, and t is a sheet thickness (unit: μm). In the light of the above, a thickness function called brittleness limit $CT_{limit}$ is defined as "$CT_{limit}=-36.7\times\ln(t/1000)+48.7$" (formula (4)) similar to $CT_{limit}$ in Patent Document 1, and is proposed as the upper limit of the CT value calculated by the formula (2).

PRIOR ART DOCUMENTS

Patent Document

Patent Document 1: JP-A-2011-530470
Patent Document 2: WO2013/130653

SUMMARY OF THE INVENTION

Problems that the Invention is to Solve

However, the upper limit of conventional CT value (for example, $CT_1$ value in Patent Document 1 or $CT_{limit}$ value in Patent Document 2) is a limit value investigated in a chemically strengthened glass having a so-called complementary error function profile in which triangular approximation can be relatively acceptable. Whether or not the upper limit of CT value depends on a factor other than a thickness t has not conventionally been investigated sufficiently.

Regarding chemically strengthened glasses with various thicknesses t having a stress profile such that triangular approximation cannot be acceptable, the inventors of the present application investigated the CT value (upper limit) at which a glass, when broken, begins to finely scatter, and have found that the actual upper limit greatly differ from a value that has been conventionally considered as the upper limit.

As a result of further extensive and intensive investigations, the inventors of the present application have found that the CT value has no clear upper limit depending on a sheet thickness t, and it is an internal energy density rE value to be newly defined that has the upper limit depending on a sheet thickness t. They have further found that even in a chemically strengthened glass having any stress profile, strength of a chemically strengthened glass can be controlled by controlling the internal energy density rE value within a numerical range determined by a sheet thickness t.

The present invention has been made in view of the above, and has an object to provide a chemically strengthened glass that does not finely scatter when the glass has broken and can further enhance strength than a conventional strength, by controlling the internal energy density rE value.

Means for Solving the Problems

Accordingly, the present invention provides a chemically strengthened glass, in which a $CT_1$ obtained by the following formula (1) and an internal tensile stress $CT_5$ obtained by the following formula (5) satisfy $CT_5/CT_1 \leq 0.85$, and when a sheet thickness of the chemically strengthened glass is t (μm), the internal tensile stress $CT_5$ satisfies $CT_5 > -38.7 \times \ln(t/1000)+48.2$ [MPa] and an internal energy density rE obtained by the following formula (6) satisfies $rE \leq 23.3 \times t/1000+15$ [kJ/m$^2$].

CS: a surface compressive stress value [MPa] of the chemically strengthened glass σ (x): a compressive stress value [MPa] at a position x in a depth direction of the chemically strengthened glass DOL: a compressive stress depth [μm] of the chemically strengthened glass t: a sheet thickness [μm] of the chemically strengthened glass

[Math. 2]

$$CT_1 = \frac{CS \times DOL}{(t - 2 \times DOL)} \quad (1)$$

[Math. 3]

$$CT_5 = \frac{2 \times \int_0^{DOL} \sigma(x)dx}{(t - 2 \times DOL)} \quad (5)$$

[Math. 4]

$$rE = \frac{CT_5 \times (t - 2 \times DOL)^2}{1000 \times t} \quad (6)$$

Advantageous Effects of the Invention

According to the disclosed technique, a chemically strengthened glass that does not finely scatter when the glass is broken, can be provided. Further, a chemically strengthened glass which has an enhanced strength compared with a conventional glass, can be provided.

MODE FOR CARRYING OUT THE INVENTION

Figure 1:
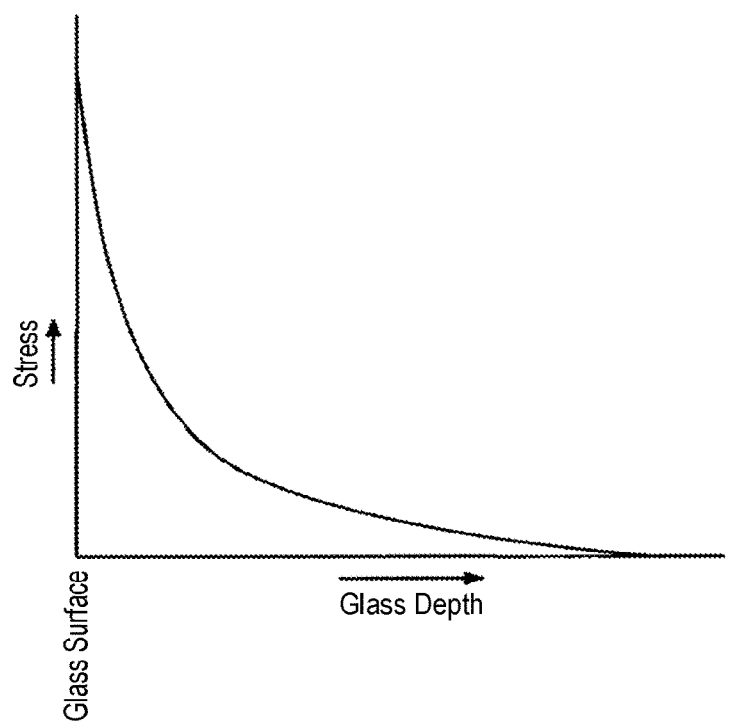
FIG. 1 is a view exemplifying stress distribution of a surface layer of a chemically strengthened glass according to the present embodiment.

An embodiment for carrying out the invention is described below by reference to the drawings. In each drawing, the same reference numerals are allotted to the same constituent parts, and overlapped explanations are omitted in some cases.

Chemically Strengthened Glass

The chemically strengthened glass according to the present embodiment generally has a plate shape, and may be a flat plate and may be a glass plate having been subjected to bending. The chemically strengthened glass according to the present embodiment is preferably a glass plate formed into a flat plate shape by a conventional glass forming method such as a float process, a fusion process or a slot downdraw process, and preferably has a liquid phase viscosity of 130 dPa·s or more.

The chemically strengthened glass according to the present embodiment can be used in a cover glass and touch sensor glass of a touch panel display provided in information appliances such as tablet PC, note PC, smart phone, and digital book reader; a cover glass of liquid crystal television, PC monitor and the like; a cover glass of automobile instrument panels and the like; a cover glass for a solar cell; an interior material of building materials; and a multilayered glass used in windows of buildings and houses; and the like.

The chemically strengthened glass according to the present embodiment has a size formable by a conventional forming method. Specifically, when formed by a float process, a continuous ribbon-shaped glass with a float forming width is obtained. Furthermore, the chemically strengthened glass according to the present embodiment is finally cut into a size suitable for use purposes.

Specifically, it has a size according to the respective uses, such as a size of a display of tablet PC or smart phone, or a cover glass for a solar cell. The chemically strengthened glass according to the present embodiment is generally cut into a rectangular shape, but may have other shape such as a circle or a polygon, and includes a perforated glass.

The sheet thickness t of the chemically strengthened glass according to the present embodiment is preferably 1500 μm or less for the contribution of reduction in weight. The sheet thickness t is more preferably 1000 μm or less, 700 μm or less, 500 μm or less, 400 μm or less, 300 μm or less, 200 μm or less, and 100 μm or less.

The chemically strengthened glass according to the present embodiment has a compressive stress layer on the surface thereof by an ion-exchange treatment. The surface compressive stress (CS) of the chemically strengthened glass is preferably 600 MPa or more, and more preferably 700 MPa or more, 800 MPa or more, 850 MPa or more, 900 MPa or more, 950 MPa or more, 1000 MPa or more, 1050 MPa or more, 1100 MPa or more, 1150 MPa or more, 1200 MPa or more, 1300 MPa or more, 1400 MPa or more, and 1500 MPa or more.

When damages with a depth exceeding DOL value as a depth of a compressive stress layer is formed on the chemically strengthened glass during use, this leads to fracture of the chemically strengthened glass. Therefore, the DOL of the chemically strengthened glass is preferably deeper and is preferably 30 μm or more, and is more preferably 40 μm or more, 50 μm or more, 55 μm or more, 60 μm or more, 65 μm or more, 70 μm or more, 75 μm or more, 80 μm or more, 85 μm or more, 90 μm or more, 95 μm or more, 100 μM or more, 110 μm or more, 120 μm or more, 130 μm or more, 140 μm or more, and 150 μm or more.

When the value of internal tensile stress CT of the chemically strengthened glass is increased, CS can be increased and DOL can be deeper, which are preferred. In short, when CS or DOL are tried to increase, CT necessarily increases. For example, in the case of a glass having a similar stress profile, if the CS or DOL value is increased 10% (the value is 1.1 times), the CT value also generally increases about 10%. Therefore, CS or DOL can approach more preferred value by increasing the CT value.

The internal tensile stress CT of the chemically strengthened glass of the present embodiment can be calculated by the following formula (5). In this formula, t is a sheet thickness (μm) of a glass, DOL is a depth (μm) of a compressive stress layer, and σ (x) is a compressive stress value (MPa) at a position x in a depth direction of the chemically strengthened glass illustrated in FIG. 1, that is, a stress profile. Hereinafter, in the case where the CT value calculated based on the formula (1) and the CT value calculated based on the formula (5) are separately explained below, those are called $CT_1$ value and $CT_5$ value, respectively. A measurement method of a stress profile of the chemically strengthened glass is described hereinafter.

[Math. 5]

$$CT_5 = \frac{2 \times \int_0^{DOL} \sigma(x)dx}{(t - 2 \times DOL)} \qquad (5)$$

The CT ($CT_5$ value) obtained by the formula (5) sometimes greatly differs from an approximate value ($CT_1$ value) of a conventional CT as obtained by, for example, the formula (1), and particularly in the case of a chemically strengthened glass that does not have a complementary error function profile in which a triangular approximation cannot be acceptable, the difference particularly becomes great. According to the formula (5), a value closer to the actual CT value can be obtained.

The $CT_5$ value of the chemically strengthened glass according to the present invention is preferably 30 MPa or more in order that CS and DOL approach more preferred values, and is more preferably 35 MPa or more, 40 MPa or more, 45 MPa or more, 50 MPa or more, 55 MPa or more, and 60 MPa or more.

To suitably increase CS and DOL more than those of a conventional chemically strengthened glass, the $CT_5$ value of the chemically strengthened glass according to the present embodiment is larger than $CT_{limit}$ value obtained by the formula (2). The $CT_{limit}$ value is experientially determined as $-38.7 \times \ln(t/1000)+48.2$ [MPa] as described in Patent Document 1, and this is a value having been considered as the upper limit of CT of a conventional chemically strengthened glass. Here, t is a sheet thickness of a glass and its unit is This value is one experientially obtained in a chemically strengthened glass having a so-called complementary error function profile in which triangular approximation can be relatively acceptable, and the chemically strengthened glass of the present embodiment has $CT_5$ exceeding the upper limit. The $CT_5$ value is more preferably 1.1 times or more, 1.2 times or more, 1.3 times of more, 1.5 times or more, 1.7 times or more, 2.0 times or more, and 3.0 times or more the $CT_{limit}$ value obtained by the formula (2). By this, a non-conventional material design becomes possible in order to suitably increase CS and DOL.

The $CT_{limit}$ value may be obtained by the formula (4) described in Patent Document 2. The $CT_{limit}$ value by the formula (4) is experientially determined as $-36.7 \times \ln(t/1000)+48.7$ [MPa]. Here, t is a sheet thickness of a glass and its unit is μm. The formula (2) and formula (4) output almost same numerical value to a general sheet thickness t.

To suitably increase CS and DOL more than those of a conventional chemically strengthened glass, it is preferred that the $CT_5$ value of the chemically strengthened glass according to the present embodiment is larger than the $CT_{limit}$ value obtained by the formula (4). The $CT_5$ value is more preferably 1.1 times or more, 1.2 times or more, 1.3 times of more, 1.5 times or more, 1.7 times or more, 2.0 times or more, and 3.0 times or more the $CT_{limit}$ value obtained by the formula (4). By this, a non-conventional material design becomes possible in order to suitably increase CS and DOL.

In the chemically strengthened glass according to the present embodiment, a stress profile greatly bends as in FIG. 1 in order to achieve large CS value and deep DOL value. In the case of a chemically strengthened glass having a bent stress profile, the $CT_5$ value based on the formula (5) is generally smaller than the $CT_1$ value based on the formula (1). It is effective to approach the CS value and the DOL vale to more preferred values as a ratio $CT_5/CT_1$ between the $CT_1$ value and $CT_5$ value of the chemically strengthened glass of the present embodiment is smaller. The $CT_5/CT_1$ is preferably 85% or less, and more preferably 70% or less, 60% or less, 50% or less, 40% or less, 30% or less, 25% or less, 20% or less, 15% or less, and 10% or less. When the $CT_5/CT_1$ value is within the above range, the CS value and the DOL value can approach more preferred values, and more preferred chemically strengthened glass can be provided.

In the chemically strengthened glass according to the present embodiment, a compressive stress value in a depth of a half value of the DOL value is preferably 40% or less, more preferably 30% or less, still more preferably 20% or less, and particularly preferably 10% or less, of the surface stress value (CS value) in order to prevent that the glass finely breaks explosively.

In the chemically strengthened glass according to the present embodiment, a position becoming a half value (HW) of the surface stress value (CS value) is preferably less than 8 μm. It is more preferably 7 μm or less, still more preferably 6 μm or less, and most preferably 5 μm or less. When the position becoming a half value (HW) of the surface stress value (CS value) is less than 8 μm, large CS value and deep DOL value can be achieved, and the chemically strengthened glass can be prevented from finely breaking explosively when the glass has fractured.

The internal energy density rE of the chemically strengthened glass according to the present embodiment is defined by the following formula (6). Here, $CT_5$ is internal tensile stress (MPa) obtained by the formula (5), DOL is a depth (μm) of a compressive stress layer, and t is a sheet thickness (μm).

[Math. 6]

$$rE = \frac{CT_5 \times (t - 2 \times DOL)^2}{1000 \times t} \quad (6)$$

Internal energy E by strain is generally obtained by (stress)×(strain)/2×(load surface S). When this is applied to a strengthened glass, the internal energy is represented by E=CT×(strain)/2×(thickness of tensile stress layer). Strain is in reverse proportion to a sheet thickness and is in proportion to a tensile stress layer, and can be therefore expressed as E∝CT×(thickness of tensile stress layer)×(thickness of tensile stress layer)/(sheet thickness). When defining as rE [kJ/m$^2$]=CT [MPa]×(thickness of tensile stress layer) [μm]× (thickness of tensile stress layer) [μm]/{(sheet thickness) [μm]×1000} considering dimension, it can be treated as same as internal energy. Therefore, in the present description, the rE is hereinafter expressed as internal energy density. When the internal energy density rE is high, new cracks are generated one by one in the vicinity of the crack, and the glass finely fractures.

When the internal energy density rE obtained by the formula (6) satisfies rE≤23.3×t/1000+15 [kJ/m$^2$] (formula 7), the glass is difficult to finely scatter when the glass has broken. The right side in the formula (7) is the upper limit of the internal energy density rE value of a chemically strengthened glass, which was found as a result of extensive and intensive investigations by the inventors of the present application. Even in a chemically strengthened glass having any stress profile, strength of the chemically strengthened glass can be controlled by controlling the internal energy density rE within a numerical range satisfying the formula (7). The basis of the right side of the formula (7) is described hereinafter.

Chemical Strengthening Treatment

By a chemical strengthening treatment, a glass substrate is, for example by dipping, brought into contact with a melt of an alkali metal salt (for example, potassium nitrate) containing alkali metal ions (typically, K ions) having large ionic radius, thereby metal ions (typically, Na ions) having small ionic radius in the glass substrate are substituted with metal ions having large ionic radius.

The chemical strengthening treatment can be conducted by, for example, dipping a glass sheet in a potassium nitrate molten salt at 350 to 500° C. for 5 minutes to 60 hours.

Examples of the molten salt for conducting an ion-exchange treatment include alkali nitrates such as potassium nitrate, potassium sulfate, potassium carbonate and potassium chloride; alkali sulfates; and alkali chlorides. Those molten salts may be used alone and may be used as combinations of two or more thereof. Furthermore, a salt containing sodium (Na ions) or lithium (Li ions) may be mixed to adjust chemical strengthening characteristics.

In the chemically strengthened glass according to the present embodiment, treatment conditions of the chemical strengthening treatment are not particularly limited, and optimum conditions can be selected considering characteristics of a glass, a molten salt, and the like.

The chemically strengthened glass according to the present embodiment is manufactured by, for examples, the following steps (1) to (3). Each step is described below.

(1) First Chemical Strengthening Step of Subjecting a Glass to an Ion-Exchange Treatment to Form a Compressive Stress Layer on the Surface of the Glass The step (1) is a step of bringing a glass to be subjected to a chemical strengthening treatment into contact with a molten salt (for example, potassium salt) containing alkali metal ions having an ionic radius larger than that of alkali metal ions (for example, Na ions) contained in the glass at a temperature region not exceeding a transition temperature of the glass to perform an ion-exchange of alkali metal ions in the glass with alkali metal ions having large ionic radius in an alkali metal salt, generating compressive stress on a glass surface by the difference of an occupied area of alkali metal ions, and forming a compressive stress layer.

The treatment temperature and treatment time for bringing the glass into contact with a molten salt containing alkali metal ions in the step (1) are appropriately adjusted depending on the composition of a glass and molten salt. The heating temperature of the molten salt is generally preferably 350° C. or higher, and more preferably 370° C. or higher. It is generally preferably 500° C. or lower, and more preferably 450° C. or lower. When the heating temperature of the molten salt is 350° C. or higher, the phenomenon that chemical strengthening is difficult to be performed by the decrease of ion-exchange rate can be suppressed. On the other hand, when it is 500° C. or lower, decomposition and degradation of the molten salt can be suppressed.

The time for bringing the glass into contact with the molten salt in the step (1) is generally preferably 1 hour or more, and more preferably 2 hours or more, 3 hours or more, 4 hours or more, and 5 hours or more, in order to give sufficient compressive stress. In the ion exchange for a long period of time, productivity drops and a compressive stress value decreases by relaxation. Therefore, it is preferably 200 hours or less, 150 hours or less, 100 hours or less, 90 hours or less, and 80 hours or less.

(2) Heating Step of Heat-Treating Glass

The step (2) is a step of heat-treating the glass obtained in the step (1), having the compressive stress layer formed on the glass surface, to move larger alkali metal ions, for example, potassium ions, present in the compressive stress layer from the surface of the glass to the direction inside the glass, thereby moving the deepest part of the compressive stress layer from the glass surface to the direction inside the glass. This step can be omitted.

Compressive stress of the glass surface decreases by moving the deepest part of the compressive stress layer from the glass surface to the direction inside the glass, but the compressive stress layer of preferably 30 μm or more from the glass surface is formed.

The temperature of heat-treating the glass is a temperature lower than the glass transition point by 50° C. or more, preferably 70° C. or more, and more preferably 100° C. or more. When the glass is heat-treated at a temperature lower than the glass transition point by 50° C. or more, stress relaxation of the glass can be prevented.

It is preferred that the time of heat-treating the glass is appropriately adjusted by the heat treatment temperature. Generally, it is preferably 30 minutes to 2000 minutes, and more preferably 30 minutes to 300 minutes.

(3) Second Chemical Strengthening Step of Subjecting Glass to Ion Exchange to Change Compressive Stress Layer on Glass Surface The step (3) is a step of subjecting the glass obtained in the step (2) to ion exchange to change the compressive stress layer on the glass surface. The compressive stress layer on the glass surface and inside the glass can be changed by again conducting ion exchange in the step (3). The ion-exchange treatment in the step (3) may be conducted in the same manner as the ion-exchange treatment described in the step (1), and may be conducted in other manner. Furthermore, other molten salt may be used.

The treatment temperature and treatment time for bringing the glass into contact with a molten salt containing alkali metal ions in the step (3) are appropriately adjusted depending on the composition of the glass and molten salt. The heating temperature of the molten salt is generally preferably 350° C. or higher, and more preferably 370° C. or higher. It is generally preferably 500° C. or lower, and more preferably 450° C. or lower. When the heating temperature of the molten salt is 350° C. or higher, the phenomenon that chemical strengthening is difficult to be performed by the decrease of ion-exchange rate is prevented. On the other hand, when it is 500° C. or lower, decomposition and degradation of the molten salt can be suppressed.

The time for bringing the glass into contact with the molten salt in the step (3) is generally preferably 5 minutes or more, and more preferably 6 minutes or more, 7 minutes or more, 8 minutes or more, 9 minutes or more, and 10 minutes or more, in order to give sufficient compressive stress. In the ion exchange for a long period of time, productivity drops and a compressive stress value decreases by relaxation. Therefore, it is preferably 5 hours or less, 3 hours or less, 2 hours or less, and 1 hour or less.

The steps (1) to (3) may be sequentially conducted in a continuous step, for example, in on-line to a glass ribbon continuously moving in a glass sheet manufacturing step, or may be discontinuously conducted in on-line. It is preferred that the step (2) is omitted from the standpoint of working efficiency.

As the molten salt for conducting an ion-exchange treatment, a treating salt containing at least potassium ions is preferably used. Preferred example of the treating salt includes a salt containing potassium nitrate in an amount of 50 mass % or more. A mixed molten salt may further contain other component. Examples of the other component include alkali sulfates such as sodium sulfate and potassium sulfate, and alkali chlorides such as sodium chloride and potassium chloride.

Measurement Method of Stress Profile

Apparatus and method for measuring a stress profile of the chemically strengthened glass according to the present embodiment are described in detail below.

Figure 2:
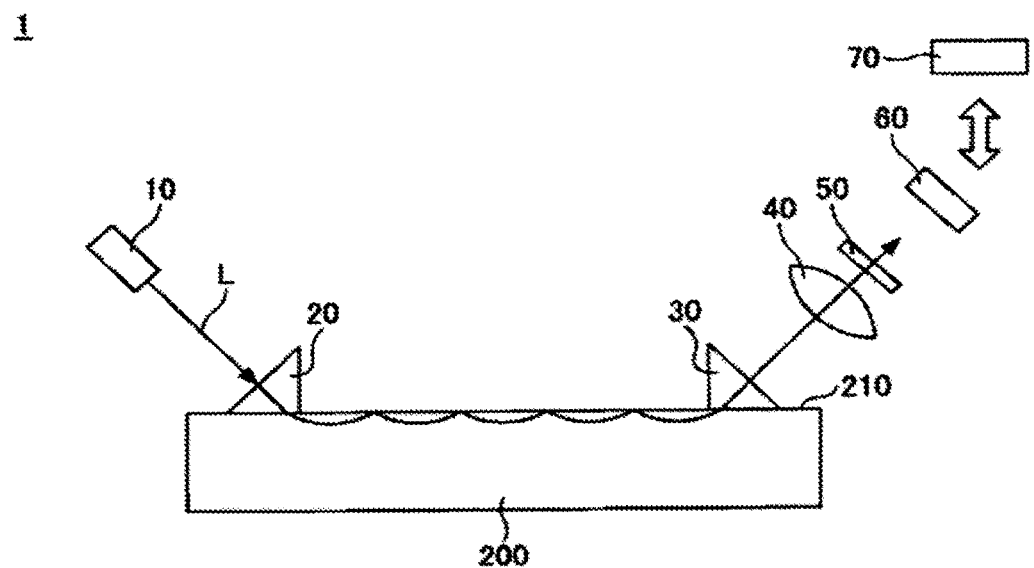
FIG. 2 is a view exemplifying a surface stress measuring apparatus of a chemically strengthened glass according to the present embodiment.

FIG. 2 is a view exemplifying a measuring apparatus of a stress profile. As illustrated in FIG. 2, a surface stress measuring apparatus 1 includes a light source 10, a light supply member 20, a light extraction member 30, a light conversion member 40, a polarizing member 50, an imaging element 60, and an operation part 70.

The reference numeral 200 is a chemically strengthened glass to be measured. The chemically strengthened glass 200 has a surface layer having a refractive index distribution by ion exchange at the side of a surface 210.

The light source 10 is arranged such that light ray L enters a surface layer of the chemically strengthened glass 200 from the light supply member 20. As the light source 10, Na lamp is used, and its wavelength is 589.3 nm (single wavelength). As the light source, mercury I line (wavelength 365 nm) or a combined light source of LED and a band path filter may be used, depending on the kind of a glass or as necessary.

The light supply member 20 and light extraction member 30 are placed in the state of optically contacting the surface 210 of the chemically strengthened glass 200 to be measured. The light supply member 20 has a function of allowing light from the light source 10 to enter the chemically strengthened glass 200. The light extraction member 30 has a function of allowing the light propagated the surface layer of the chemically strengthened glass 200 to exit outside the chemically strengthened glass 200.

For the light supply member 20 and light extraction member 30, a prism made of an optical glass is used. Inclination angle of the prism is 60°, and a refractive index of the prism is 1.72. Furthermore, the light supply member 20 and light extraction member 30 are used as an integrated structure. Matching liquid having a refractive index of 1.64 is charged between the light supply member 20 and light extraction member 30 and the chemically strengthened glass 200 in order to stably performing optical contact. In the case where the refractive index of the chemically strengthened glass 200 exceeds 1.64, a liquid having a refractive index of a value between refractive indexes of the light supply member 20 and light extraction member 30 and a refractive index of the chemically strengthened glass 200 is used. Even in such a case, there is no difference in the value of stress distribution obtained.

The imaging element 60 is arranged in a direction of light emitted from the light extraction member 30, and the light conversion member 40 and polarizing member 50 are inserted between the light extraction member 30 and the imaging element 60.

The light conversion member 40 has a function of converting light ray emitted from the light extraction member 30 to a row of bright line and collecting the light on the imaging element 60. As the light conversion member 40, a convex lens is used.

The polarizing member 50 is a light separation means having a function of selectively transmitting one of two kinds of light components vibrating in parallel or vertical to the boundary surface between the chemically strengthened glass 200 and the light extraction member 30. As the polarizing member 50, a polarizing plate having two kinds of polarizing functions capable of imaging each of P polarized light and S polarized light is used. The light component vibrating in parallel to the boundary surface between the chemically strengthened glass 200 and the light extraction member 30 is S polarized light, and the light component vibrating vertical thereto is P polarized light.

The boundary surface between the chemically strengthened glass 200 and the light extraction member 30 is vertical to a light emission surface of light emitted outside the chemically strengthened glass 200 through the light extraction member 30. Therefore, it can be said in another way that the light component vibrating vertical to the light emission surface of light emitted outside the chemically strengthened glass 200 through the light extraction member 30 is S polarized light, and the light component vibrating in parallel thereto is P polarized light.

The imaging element 60 has a function of converting light emitted from the light extraction member 30 and received through the light convention member 40 and polarizing member 50 into electrical signal. In more detail, the imaging element 60 converts the light received into electrical signal, and outputs brightness every pixel of a plurality of pixels constituting an image as image data to the calculation part 70. As the imaging element 60, CCD (Charge Coupled Device) element is used.

The operation part 70 has a function of retrieving image data from the imaging element 60 and performing image processing and numeric calculation. For the operation part 70, a personal computer constituted so as to include CPU (Central Processing Unit) is used.

In the surface stress measuring apparatus 1, the light ray L entered the surface layer of the chemically strengthened glass 200 through the light supply member 20 from the light source 10 propagates in the surface layer. When the light ray L propagates in the surface layer, mode is generated by optical guided-wave effect, and the light ray goes in some determined paths and is extracted outside the chemically strengthened glass 200 by the light extraction member 30.

Image is formed as bright lines of P polarized light and S polarized light every mode on the imaging element 60 by the light conversion member 40 and the polarizing member 50. Image data of bright lines of P polarized light and S polarized light in the number of modes generated on the imaging element 60 are sent to the operation part 70. In the operation part 70, the positions of bright lines of P polarized light and S polarized light on the imaging element 60 are calculated from the image data sent from the imaging element 60.

By the constitution, the respective refractive index distributions of P polarized light and S polarized light in a depth direction from the surface in the surface layer of the chemically strengthened glass 200 are calculated based on the positions of bright lines of the P polarized light and S polarized light in the surface stress measuring apparatus 1. The stress distribution in a depth direction from the surface in the surface layer of the chemically strengthened glass 200 is calculated based on the difference in the calculated refractive index distributions between the P polarized light and S polarized light and a photoelastic constant of the chemically strengthened glass 200.

Measurement of refractive index distribution and measurement of stress distribution in the surface stress measuring apparatus 1 are described in more detail below.

Mode and Bright Line

Trajectory of light ray and mode when light entered the surface layer of the chemically strengthened glass 200 are described below by reference to FIG. 3, FIG. 4 and the like.

Figure 3:
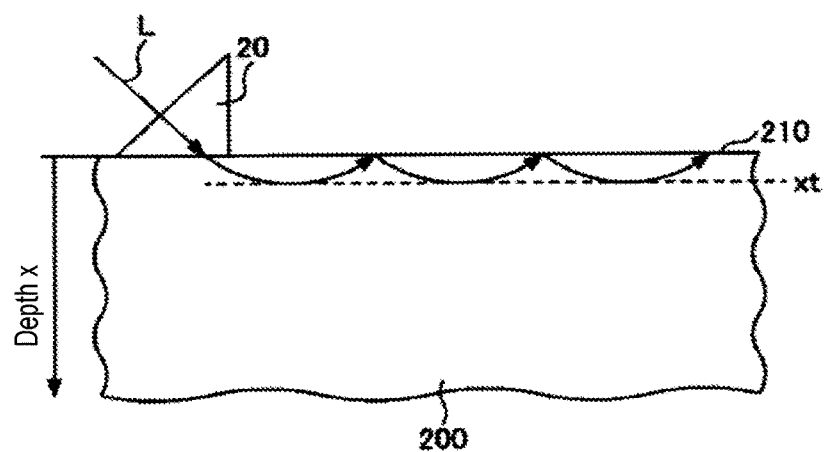
FIG. 3 is a view explaining a mode.
Figure 4:
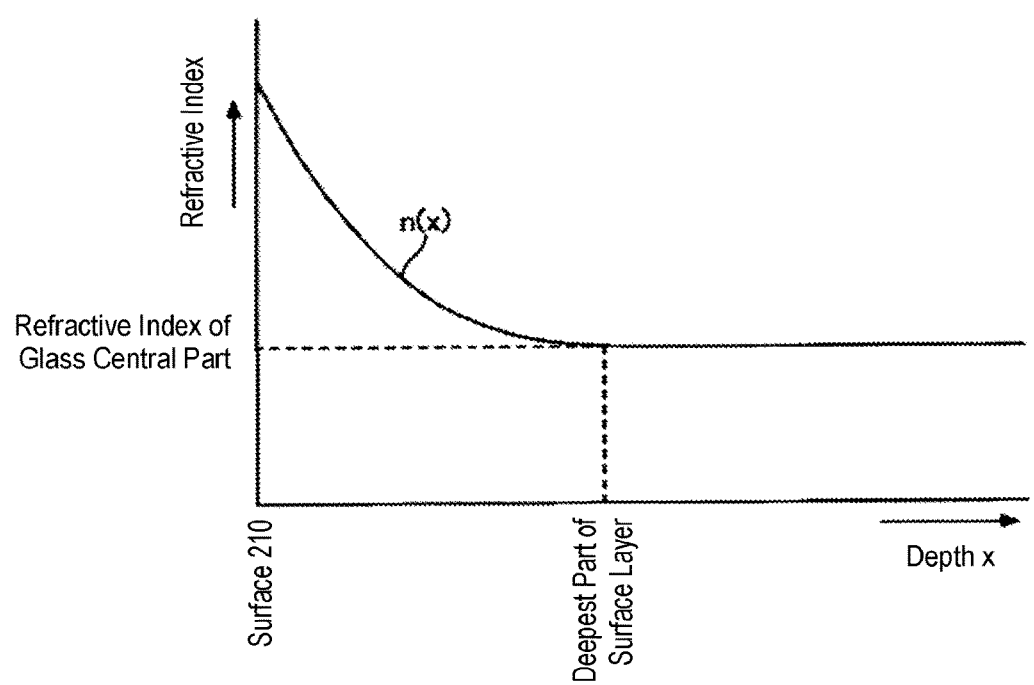
FIG. 4 is a view exemplifying refractive index distribution of a surface layer of a chemically strengthened glass.

In FIG. 3, the chemically strengthened glass 200 has a refractive index distribution in a depth direction from the surface 210. When a depth from the surface 210 is x and a refractive index distribution in a depth direction is n(x) in FIG. 3, the refractive index distribution n(x) in a depth direction becomes like a curve shown in FIG. 4. Specifically, in the chemically strengthened glass 200, the refractive index of the surface 210 increases by chemically strengthening or the like and decreases with increasing the depth, and becomes the same as the refractive index of the original glass at a depth at which the surface layer ends (a depth at which the change in a refractive index by ion exchange disappears) and becomes constant (refractive index of the original glass) at the part deeper than the depth.

Thus, the refractive index decreases with progressing toward an inside direction in the surface layer of the chemically strengthened glass 200. For this reason, in FIG. 3, in the light ray L entered at a small angle to the surface 210 (in the example of FIG. 3, light enters through the light supply member 20 having a refractive index larger than that of the chemically strengthened glass 200), the trajectory of light ray gradually approaches in parallel to the surface 210, and reverses in a direction of the surface 210 from the depth direction at the deepest point xt. The light ray in which the trajectory of light ray reversed goes to the surface 210 in a shape similar to the shape of the trajectory of light ray from the entering point to the reversing point, and at least a part thereof reflects on the surface 210 and again goes to the inside of the chemically strengthened glass 200.

The light ray again went to the inside of the chemically strengthened glass 200 passes through the trajectory of the same shape as the trajectory of light ray until then, reverses at the depth xt and returns to the surface 210. This is repeated, and the light ray goes ahead while reciprocating between the surface 210 and the deepest point xt. The light travels in a limited space having a width xt from the surface 210, and therefore the light can propagate only as a discrete mode of a finite value.

Specifically, only a plurality of light rays having determined paths can propagate in the surface layer of the chemically strengthened glass 200. This phenomenon is called an optical guided-wave effect, and is a theory that light ray travels in an optical fiber. The mode of light propagating on the surface 210 by the optical guided-wave effect and the trajectory of light ray of the mode are determined by a refractive index distribution in a depth direction from the surface 210.

Figure 5:
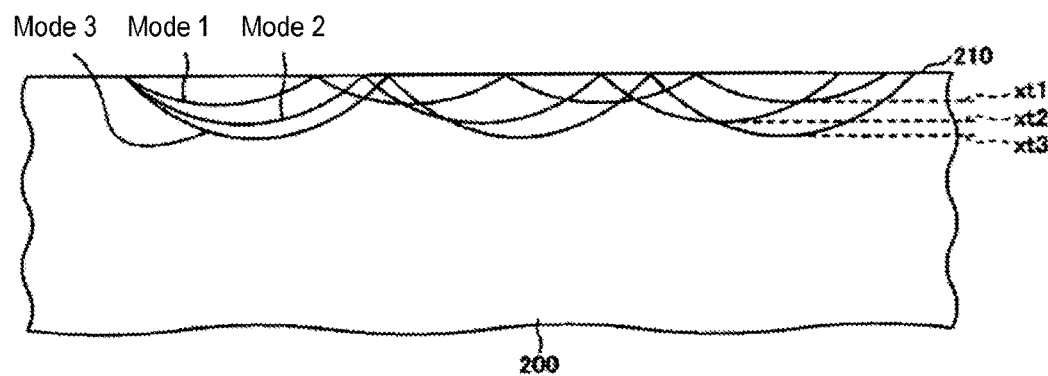
FIG. 5 is a view explaining trajectory of light ray in each mode in the case where a plurality of modes is present.

FIG. 5 is a view explaining trajectory of light ray in each mode when a plurality of modes is present. Three modes of mode 1, mode 2 and mode 3 are illustrated in the example of FIG. 5. However, this is to simplify the explanation, and further higher-degree mode is sometimes present depending on the chemically strengthened glass. The mode 1 having the lowest degree has the angle to the surface 210 when the trajectory of light ray reflects on the surface 210 being the smallest (output complementary angle that means 90° minus output angle is the smallest). Furthermore, the deepest point of the trajectory of light ray differs every mode, and the deepest point xt1 of the mode 1 is the shallowest. The angle to the surface 210 when reflecting at the surface 210 increases (output complementary angle increases) with increasing the degree of mode. The deepest point xt2 of the mode 2 is deeper than the deepest point xt1 of the mode 1, and the deepest point xt3 of the mode 3 is further deeper than the deepest point xt2 of the mode 2.

The incident angle to a predetermined surface of light ray is an angle between an incident light ray and a normal line of a predetermined surface. On the other hand, an incident complementary angle to a predetermined surface of light ray that means 90° minus incident angle is an angle between incident light ray and a predetermined surface. Specifically, when an incident angle to a predetermined surface of light ray is θ, the incident complementary angle to a predetermined surface of light ray is $\pi/2 - \theta$. The same can apply to the relationship between an output angle and an output complementary angle to a predetermined surface of light ray.

In FIG. 5, the incident light is shown by one light ray, but the incident light has certain breadth. In the light having spread, a complementary angle of light emitted from the surface 210 is the same in the same mode. Lights other than the modes generated cancel each other, and as a result, lights other than the light corresponding to each mode are not emitted from the surface 210.

In FIG. 2, the light supply member 20, the light extraction member 30 and the chemically strengthened glass 200 have the same shape in a depth direction. For this reason, light collected in the light conversion member 40 is image-formed on the imaging element 60 as a focus plane of the light conversion member 40 such that light corresponding to the mode constitutes bright line in a depth direction.

Figure 6:
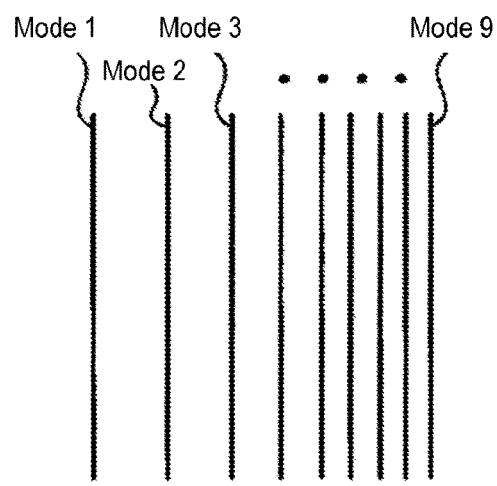
FIG. 6 is a view exemplifying a row of bright lines corresponding to a plurality of modes.

The output complementary angle differs every mode, and therefore, the bright lines arrange in the order of every mode, and constitute a row of bright lines, as illustrated in FIG. 6. The row of bright lines generally becomes a row of light lines. However, in the case where the light supply member 20 and the light extraction member 30 in FIG. 2 are adjacent to each other and are integrated, direct light from a light source acts as reference light to an emitted light, and a row of dark lines may be formed. However, even in the case where a row of light lines is formed and even in the case where a row of dark lines is formed, the position of each line is entirely the same.

Thus, the bright line is developed with light lines or dark lines when a mode is established. Even in the case where interference color of bright line changes by light and shade of reference light, the calculation of refractive index distribution and stress distribution according to the present embodiment are not entirely affected. For this reason, in the present description, light line and dark line are expressed as bright line for convenience sake.

Output complementary angle when light ray propagated in the surface layer is refracted and outputs outside the chemically strengthened glass 200 is equal to that of critical refracted light when a medium having a refractive index equal to a refractive index of the chemically strengthened glass 200 at the deepest point of the trajectory of light ray in the surface layer of the light ray, that is, effective refractive index nn, has come into contact with the light extraction member 30. It can be interpreted that the deepest point in each mode is a point at which light ray in the mode totally reflects.

When a focus distance of the light conversion member 40 is f, a refractive index of the light extraction member 30 is $n_p$, and a refractive index of the chemically strengthened glass 200 is $n_g$, the relationship between the difference $\Delta n$ in the effective refractive index nn between certain modes and a distance $\Delta S$ between bright lines has the relationships of the following formula (8) and formula (9).

[Math. 7]

$$\Delta n = k_1 \cdot \Delta S \qquad (8)$$

[Math. 8]

$$k_1 = \frac{1}{f}\sqrt{1 - \left(\frac{n_g}{n_p}\right)^2} \qquad (9)$$

Therefore, if the position of an effective refractive index at one point on the imaging element 60 is found, an effective refractive index of each mode corresponding to the bright line, that is, a refractive index at the deepest point of the trajectory of light ray in the surface layer of the chemically strengthened glass 200, can be obtained from the position of the bright line to be observed.

Calculation of Refractive Index Distribution

Refractive index distribution is calculated by using the following formula (10). To obtain the condition establishing the mode in an optional refractive index distribution, the refractive index distribution is defined as optional distribution n(x).

In the formula (10), θ is an output complementary angle of light ray linearly going ahead in a slight distance dr, $n_0$ is a refractive index of the surface of a chemically strengthened glass, Θ is an output complementary angle of light ray entered a chemically strengthened glass, λ, is a wavelength of light ray entering a chemically strengthened glass, and N is the degree of a mode (for example, N=1 when mode 1). Furthermore, G1 is a point at which light ray enters a chemically strengthened glass, F2 is the deepest point (xt) at which light ray reverses, G2 is a point at which light ray reversed at F2 again reaches a chemically strengthened glass and they differ every mode. The first term on the left side is a term relating to light propagating in a surface layer, and the second term on the left side is a term relating to light propagating on the surface 210.

[Math. 9]

$$\int_{G1F2G2} n(x) \cos\theta \, dr - 2d_{G1G2}n_0 \cos\Theta = \lambda\left(N - \frac{1}{4}\right) \qquad (10)$$

Assuming that change rate in a refractive index of the chemically strengthened glass 200 is constant between the deepest points of modes having the adjacent degrees, a depth at the deepest point of each mode is calculated in sequence from the mode having the lowest degree by using the formula (10), and the whole refractive index distribution is obtained.

For example, in FIG. 5, the refractive indexes, that is, effective refractive indexes, of the surface layer at depths of the deepest parts xt1, xt2, xt3, . . . in each mode are defined as $n_1$, $n_2$, $n_3$, . . . . The change rates of refractive indexes between the surface 210 and xt1, between xt1 and xt2, between xt2 and xt3, . . . are considered to be linear, and the change rates of refractive indexes are defined as α1, α2, α3, . . . .

α1, α2, xt1, and xt2 are obtained by using modes 1 and 2 passing through the part nearest to the surface 210. In the mode 3, xt1 and xt2 are known, and unclear parameter is only xt3. Therefore, xt3 is obtained based on those. Similarly, xt4, xt5, . . . are obtained in the order of modes 4, 5, . . . , and xtn at the deepest point corresponding to all of modes is obtained. A refractive index in a depth direction from the surface 210 is then obtained.

Figure 7:
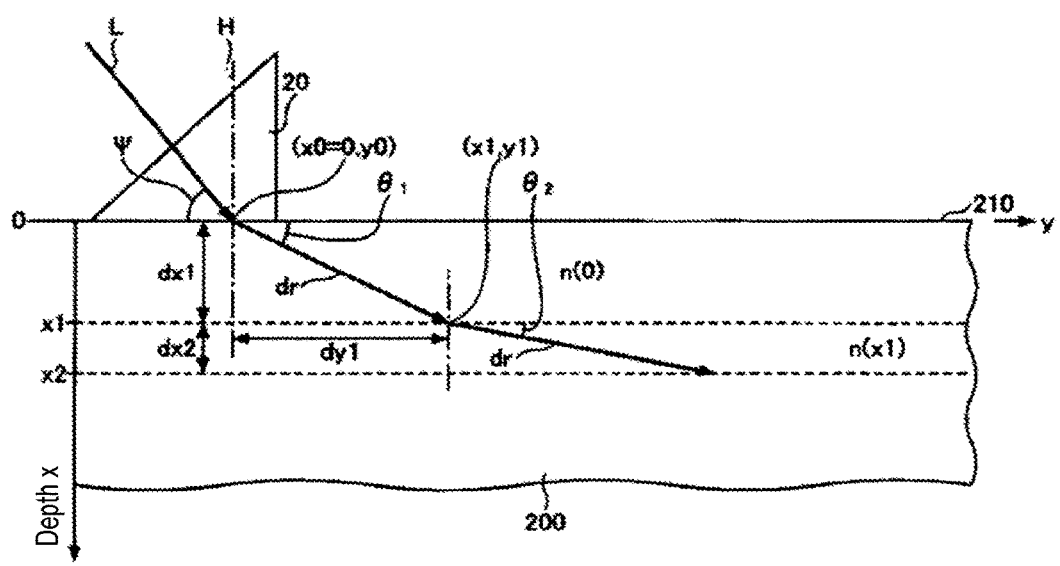
FIG. 7 is a view showing trajectory of light ray inside a glass.

FIG. 7 is a view illustrating trajectory of light ray inside a glass. Specific method of calculating a refractive index distribution is descried below by reference to FIG. 7. The left side of the formula (10) is first obtained by using a ray tracing method. In FIG. 7, x direction (vertical direction) is a depth direction of the chemically strengthened glass 200, and y direction (horizontal direction) is a direction horizontal to the surface 210 of the chemically strengthened glass 200. Refractive index at the depth x is n(x). H is a normal line of the surface 210.

Refractive index of the light supply member 20 is regarded as 1.72, and light ray L entering the surface 210 at an incident complementary angle Ψ from the light supply member 20 is considered. A coordinate of the incident point is regarded as (x0, y0), in which x0=0. In this case, the light ray L entered inside the chemically strengthened glass 200 refracts at an output complementary angle θ1 and goes ahead. In this case, Snell's expression is established between Ψ and θ1.

The trajectory of the light ray L is a curve in the inside of the chemically strengthened glass 200, but it is assumed that the light ray goes ahead linearly in a slight distance dr (the distance dr is desirably from about 1/10 to 1/100 of a wavelength). In other words, the light ray linearly goes ahead only dr in a direction of the output complementary angle θ1. In this case, an amount of movement in the x direction is dx1=dr·sin θ1, and an amount of movement in the y direction is dy1=dr·cos θ1. The coordinate of the point moved is (x1, y1)=(dr·sin θ1, y0+dr·cos θ1).

The refractive index at the coordinate (x0=0, y0) as the starting point of the partially trajectory of light ray is n(0), and the refractive index at the coordinate (x1, y1) as the end point is n(x1). However, assuming that the refractive index at the starting point is maintained constant in the trajectory of light ray and the refractive index changes to n(x1) at the end point, the next trajectory of light ray changes its angle to the output complementary angle θ2 and goes ahead, according to Snell's law. The light going ahead at the output complementary angle θ2 goes ahead linearly in only the distance dr, and further goes ahead by changing its direction to an output complementary angle θ3 (not shown). This is repeated to trace the trajectory of light ray, and the whole trajectory of light ray is obtained.

In this case, the first term on the left side of the formula (10) is calculated every dr advance. For example, in the part of from the coordinate (x0=0, y0) to the coordinate (x1, y1), the first term is calculated as dr·cos θ1·n(0). Other drs are similarly calculated. When the first term obtained every dr is added up until the trajectory of light ray returns to the surface 210, all of the first term on the left side of the formula (10) is determined. Furthermore, in this case, the distance Σdy of the trajectory of light ray going ahead in y direction is obtained. In the formula (10), since $d_{G1G2}=\Sigma dy$ and θ=θ1, the second term on the left side of the formula (8) is determined, and all of the left side of the formula (10) is determined.

The method for calculating a refractive index distribution is described below. As shown in Yogyo-Kyokai-Shi 87 (3) 1979, the refractive index of the surface 210 and the deepest point of the mode 2 are obtained from the positions of bright lines of the mode 1 and mode 2. From this, values at three points, the surface 210 (x=0), the deepest point (xt1) of the mode 1 and the deepest point (xt2) of the mode 2, and refractive indexes $n_0$, $n_1$ and $n_2$ at those points, are obtained. However, the surface is extrapolation of the mode 1 and mode 2, and therefore, the three points are straight lines.

Assuming that the deepest point xt3 in the mode 3 is a certain value, the refractive index distribution up to xt3 is defined. Thereafter, the left side of the formula (10) in this distribution is calculated by the above calculation method. The right side is determined by the order of a mode, and is 2.75λ, in the mode 3.

Thereafter, xt3 is considered as a parameter, and xt3 is obtained by using a calculation method of a nonlinear equation such as a bisection method or Newton's method. After obtaining up to xt3, xt4 is determined by a bright line position of the next mode 4, and the whole refractive index distribution of all bright lines is calculated by similarly repeating the calculation.

Calculation of Stress Distribution

Stress distribution σ(x) in a depth direction from the surface 210 of the chemically strengthened glass 200 is calculated based on the difference in the refractive index distribution between the P polarized light and the S polarized light and a photoelastic constant of the chemically strengthened glass 200. Specifically, the stress distribution is calculated by using the following formula (11). In the formula (11), kc is a photoelastic constant, and $\Delta n_{PS}(x)$ is the difference in the refractive index distribution between the P polarized light and the S polarized light. The refractive index distribution $n_P(x)$ of the P polarized light and the refractive index distribution $n_S(x)$ of the S polarized light are each discretely obtained. Therefore, the stress distribution σ(x) is calculated by using each point.

[Math. 10]

$$\sigma(x) = \Delta n_{PS}(x)/kc \qquad (11)$$

The refractive index distribution $n_P(x)$ of the P polarized light and the refractive index distribution $n_S(x)$ of the S polarized light are specifically obtained as $n_P(x_i)$ and $n_S(x_k)$, respectively. This means that each refractive index distribution obtained above is discrete, and i and k are each an integer. Because the position of the bright lines differs between the P polarized light and the S polarized light, $x_i=x_k$ is not always established even though i=k=1. For this reason, the refractive index at x is obtained by that regarding the nearest two points $x_i$ and $x_{i+1}$ from x, the refractive indexes $n_P(x_i)$ and $n_P(x_{i+1})$ and the refractive indexes $n_S(x_k)$ and $n_S(x_{k+1})$ are subjected to linear interpolation. By this, the refractive index distribution $n_P(x)$ of the P polarized light and the refractive index distribution $n_S(x)$ of the S polarized light can be obtained at an optional x.

$\Delta n_{PS}(x_m)$ is derived from the difference between $n_P(x_m)$ and $n_S(x_m)$ obtained by calculating x with the increments of 1 μm. $\sigma(x_m)$ is obtained by applying $\Delta n_{PS}(x_m)$ to the formula (11). The m is an integer. σ(x) as a continuous stress distribution function is obtained by approximating the stress distribution $\sigma(x_m)$ obtained regarding x with 1 μm increments by the least-squares method using two error functions. In the stress distribution σ(x) obtained by approximation, the point becoming stress 0 is a DOL value.

However, the CT value is obtained from the slight difference in the refractive index between the P polarized light and the S polarized light. Therefore, in the part in which the change of a refractive index is particularly small (in the vicinity of zero cross at which the gradient of a refractive index distribution is mild), the difference in the refractive index between the P polarized light and the S polarized light becomes small and the measurement error becomes large. Therefore, the CT value ($CT_5$ value) is calculated by using the formula (5) such that the value obtained by integrating the stress distribution of the compressive stress layer calculated, in a depth direction of the chemically strengthened glass 200 balances the tensile stress inside the chemically strengthened glass 200. Here, σ(x) is the stress distribution function obtained by the formula (11), and corresponds to the compressive stress value at the position x in a depth direction of the chemically strengthened glass 200 illustrated in FIG. 7. The interval of integration is from the surface 210 to the center of the chemically strengthened glass 200, and the $CT_5$ value is determined such that the integration result is zero.

Flow of Measurement

Figure 8:
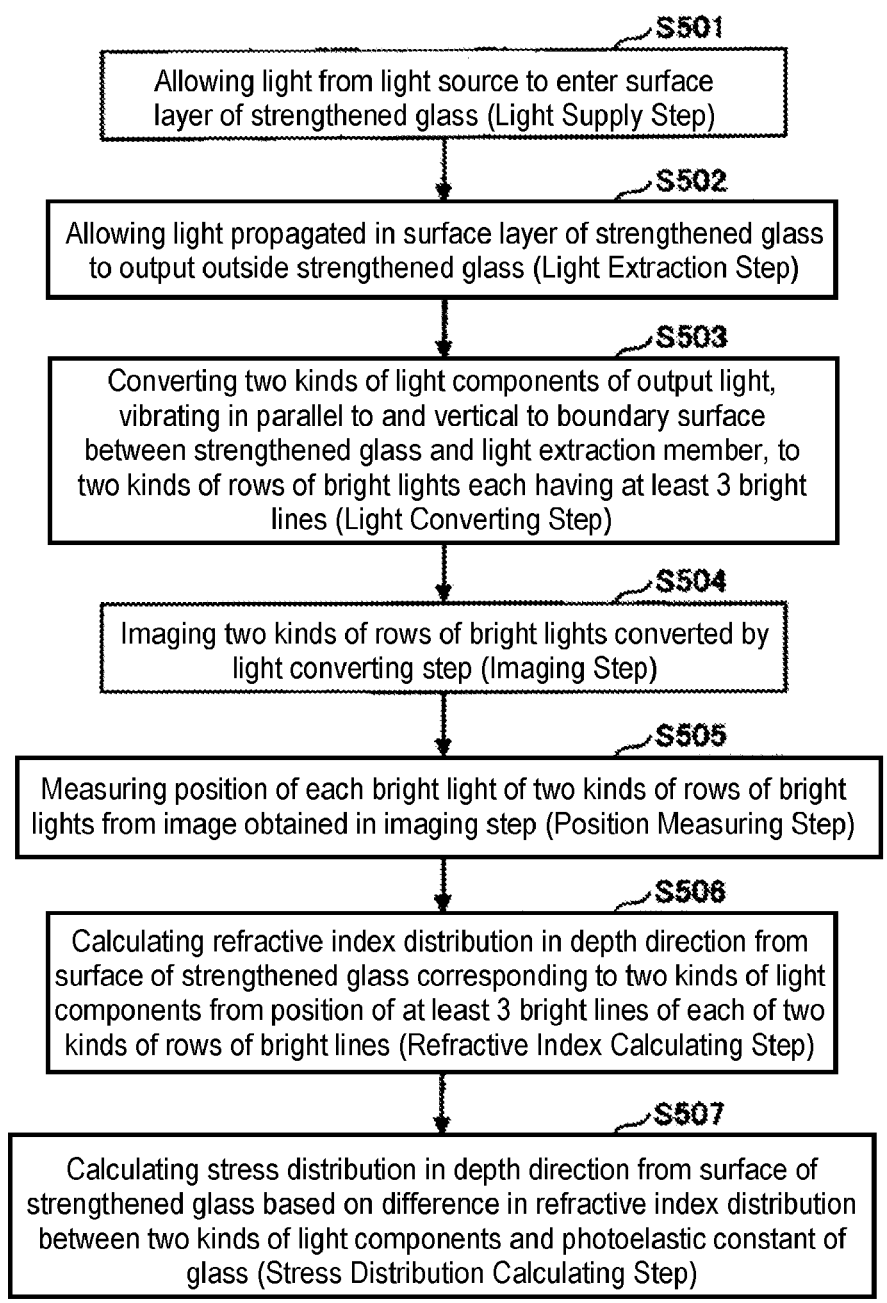
FIG. 8 is a flow chart exemplifying a stress measurement method of a chemically strengthened glass according to the present embodiment.

FIG. 8 is a flow chart exemplifying the measurement method according to the present embodiment. In a step S501, light from the light source 10 is allowed to enter the surface layer of the chemically strengthened glass 200 (light supply step). Next, in a step S502, the light propagated in the surface layer of the chemically strengthened glass 200 is allowed to output outside the chemically strengthened glass 200 (light extraction step).

Next, in a step S503, the light conversion member 40 and the polarizing member 50 convert two kinds of light components (P polarized light and S polarized light) vibrating in parallel to and vertical to the output surface of the output light to two kinds of rows of bright lights each having at least 3 bright lines (light converting step).

Next, in a step S504, the imaging element 60 images the two kinds of rows of bright lights converted by the light converting step (imaging step). Next, in a step S505, a position measuring means 71 in the operation part 70 measures the position of each bright light of two kinds of rows of bright lights from the image obtained in the imaging step (position measuring step).

Next, in a step S506, a refractive index calculating means 72 in the operation part 70 calculates a refractive index distribution in a depth direction from the surface 210 of the chemically strengthened glass 200 corresponding to two kinds of light components from the position of at least 3 bright lines of each of two kinds of rows of bright lines (refractive index calculating step).

Next, in a step S507, a stress distribution calculating means 73 in the operation part 70 calculates a stress distribution in a depth direction from the surface 210 of the chemically strengthened glass 200 based on the difference in a refractive index distribution between two kinds of light components and the photoelastic constant of the glass (stress distribution calculating step).

A refractive index distribution in a depth direction from the surface of the chemically strengthened glass corresponding to two kinds of light components is calculated from the positions of at least three bright lines of each of two kinds of rows of bright lights by the above measurement apparatus and measurement method. A stress distribution in a depth direction from the surface of the chemically strengthened glass is then calculated based on the difference in a refractive index distribution between two kinds of light components and the photoelastic constant of the glass.

Uses of the chemically strengthened glass according to the present embodiment are not particularly limited. Due to high mechanical strength, it is suitably used in portions at which impact by dropping and contact with other substances are expected.

EXAMPLES

Examples corresponding to the chemically strengthened glass according to the present embodiment are described below.

Evaluation Method

Various evaluations in the Examples were conducted by the analytical methods described below.

Evaluation of Glass: Surface Stress

Stress distribution of the chemically strengthened glasses of the present Examples was calculated by the method described in the embodiment described above. Specifically, the stress distribution was calculated by the calculation method described in the item of (Calculation of stress distribution) described above based on the whole refractive index distribution calculated in each of the P polarized light and the S polarized light.

In the stress distribution, a stress value (unit is MPa) at which a glass depth from the outermost surface is 0 μm was defined as a surface compressive stress value (CS) of the compressive stress layer of the chemically strengthened glasses of the present Examples. The minimum value (unit is μm) in a glass depth at which a stress value inside a glass is 0 MPa was defined as a depth (DOL) of a compressive stress layer. A position (HW, unit is μm) at which a stress value is a half of a CS value was obtained from the stress distribution.

Evaluation of Chemically Strengthened Glass: Cracking Behavior

Figure 9:
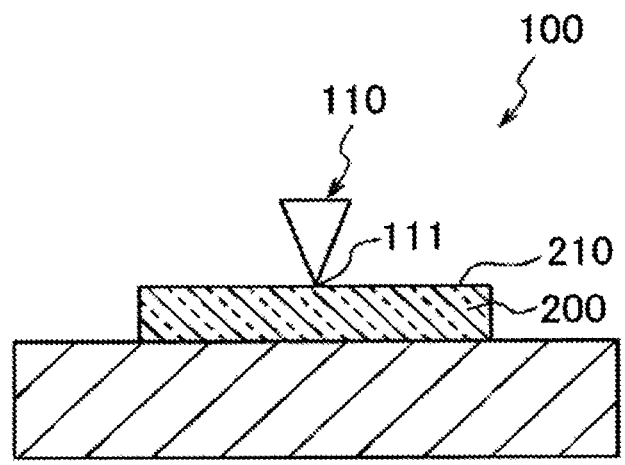
FIG. 9 is a view explaining an observation method of the number of fragments of a chemically strengthened glass according to the present embodiment.

Cracking behavior of the chemically strengthened glass was evaluated as follows. The evaluation method is illustrated in a schematic view of FIG. 9. An indenter 110 was pushed under a static load condition such that the tip 111 thereof is vertical to the surface 210 of the chemically strengthened glass 200. FLS-ARS9000, manufactured by Future-Tech Corp. was used as Vickers hardness tester 100 with which the indenter 110 is equipped. The indenter 110 used was one having the facing angle of the tip 111 being 60°. The indenter 110 was pushed to the surface 210 of the chemically strengthened glass 200 in a rate of 60 μm/sec such that a load of 4 kgf (about 39.2N) was applied to the indenter 110, and maintained for 15 seconds in the state of having reached the load. The load was then removed from the indenter, and the chemically strengthened glass 200 after 60 seconds was observed. By this, the number of broken pieces (the number of fragments) of the chemically strengthened glass 200 broken was counted, and the cracking behavior of the chemically strengthened glass 200 was evaluated.

Examples 1 to 4

First Chemical Strengthening Step

Potassium nitrate ($KNO_3$) and sodium nitrate ($NaNO_3$) were added to SUS cap such that the total amount thereof was 4000 g and the $KNO_3$ concentration (mass %) was the concentration as shown in the item of first chemical strengthening step in Table 1, and heated to a predetermined temperature by a mantle heater. Thus, a mixed molten salt of potassium nitrate and sodium nitrate was prepared. Aluminosilicate glass of 50 mm×50 mm×400 μm was preheated to 350° C., dipped in the molten salt for a predetermined time to perform an ion exchange treatment, and then cooled to the vicinity of room temperature. Thus, a first chemical strengthening treatment was performed. The conditions of the first chemical strengthening treatment are shown in Table 1. The chemically strengthened glass obtained was washed with water and then subjected to the next step.

Composition (indicated by mol %) of aluminosilicate glass (specific gravity: 2.41): $SiO_2$ 68%, $Al_2O_3$ 10%, $Na_2O$ 14%, MgO 8%

Second Chemical Strengthening Step

Potassium nitrate ($KNO_3$) and sodium nitrate ($NaNO_3$) were added to SUS cap such that the total amount thereof was 4000 g and the $KNO_3$ concentration (mass %) was the concentration as shown in the item of second chemical strengthening step in Table 1, and heated to a predetermined temperature by a mantle heater. Thus, a mixed molten salt of potassium nitrate and sodium nitrate or 100 mass % potassium nitrate molten salt was prepared. The glass having been subjected to the first chemical strengthening step was preheated to 350° C., dipped in the molten salt for a predetermined time to perform an ion exchange treatment, and then cooled to the vicinity of room temperature. Thus, a second chemical strengthening treatment was performed. The conditions of the second chemical strengthening treatment are shown in Table 1. The chemically strengthened glass obtained was cleaned with pure water several times and then dried by air blowing. Thus, chemically strengthened glasses of Examples 1 to 4 were obtained.

Examples 5 to 8

Chemically strengthened glasses of Examples 5 to 8 were obtained in the same manner as in Example 1, except for using aluminosilicate glass of 50 mm×50 mm×550 μm. The conditions of the first and second chemical strengthening treatments are shown in Table 1.

Examples 9 and 10

Chemically strengthened glasses of Examples 9 and 10 were obtained in the same manner as in Example 1, except for using aluminosilicate glass of 50 mm×50 mm×800 μm. The conditions of the first and second chemical strengthening treatments are shown in Table 1.

Examples 11 to 15

Chemically strengthened glasses of Examples 11 to 15 were obtained in the same manner as in Example 1, except for using aluminosilicate glass of 50 mm×50 mm×1000 μm. The conditions of the first and second chemical strengthening treatments are shown in Table 1.

Examples 16 to 18

First Chemical Strengthening Step

Potassium nitrate ($KNO_3$) and sodium nitrate ($NaNO_3$) were added to SUS cap such that the total amount thereof was 4000 g and the $KNO_3$ concentration (mass %) was the concentration as shown in the item of first chemical strengthening step in Table 1, and heated to a predetermined temperature by a mantle heater. Thus, a mixed molten salt of potassium nitrate and sodium nitrate or 100 mass % potassium nitrate molten salt was prepared. Aluminosilicate glass of 50 mm×50 mm×500 μm was preheated to 350° C., dipped in the molten salt for a predetermined time to perform an ion exchange treatment, and then cooled to the vicinity of room temperature. Thus, a first chemical strengthening treatment was performed. The conditions of the first chemical strengthening treatment are shown in Table 1. The chemically strengthened glass obtained was cleaned with pure water several times and then dried by air blowing. Thus, chemically strengthened glasses of Examples 16 to 18 were obtained without subjecting to a second chemical strengthening step.

Composition (indicated by mol %) of aluminosilicate glass (specific gravity: 2.41): $SiO_2$ 68%, $Al_2O_3$ 10%, $Na_2O$ 14%, MgO 8%

Examples 19 to 21

Chemically strengthened glasses of Examples 19 to 21 were obtained in the same manner as in Example 16, except for using aluminosilicate glass of 50 mm×50 mm×800 μm. The conditions of the first chemical strengthening treatment are shown in Table 1.

Examples 22 to 24

Chemically strengthened glasses of Examples 22 to 24 were obtained in the same manner as in Example 16, except for using aluminosilicate glass of 50 mm×50 mm×1000 μm. The conditions of the first chemical strengthening treatment are shown in Table 1.

Example 25

Chemically strengthened glass of Example 25 was obtained in the same manner as in Example 1, except for using aluminosilicate glass of 50 mm×50 mm×800 μm. The conditions of the first and second chemical strengthening treatments are shown in Table 1.

TABLE 1

| | | First chemical strengthening step | | | Second chemical strengthening step | | |
|---|---|---|---|---|---|---|---|
| | Sheet Thickness t [μm] | $KNO_3$ concentration [mass %] | Strengthening time [h:min] | Strengthening temperature [° C.] | $KNO_3$ concentration [mass %] | Strengthening time [h:min] | Strengthening temperature [° C.] |
| Ex. 1 | 400 | 50 | 27:00 | 450 | 100 | 5:40 | 425 |
| Ex. 2 | 400 | 50 | 55:00 | 450 | 99.5 | 3:00 | 425 |
| Ex. 3 | 400 | 50 | 55:00 | 450 | 95 | 0:20 | 425 |
| Ex. 4 | 400 | 50 | 27:00 | 450 | 96 | 6:20 | 400 |
| Ex. 5 | 550 | 50 | 55:00 | 450 | 99 | 1:20 | 425 |
| Ex. 6 | 550 | 50 | 55:00 | 450 | 99.5 | 3:00 | 425 |
| Ex. 7 | 550 | 50 | 55:00 | 450 | 100 | 5:40 | 425 |
| Ex. 8 | 550 | 50 | 55:00 | 450 | 96 | 0:50 | 450 |
| Ex. 9 | 800 | 50 | 55:00 | 450 | 96 | 6:00 | 425 |
| Ex. 10 | 800 | 50 | 55:00 | 450 | 96.5 | 5:15 | 450 |
| Ex. 11 | 1000 | 50 | 55:00 | 450 | 99 | 6:00 | 400 |
| Ex. 12 | 1000 | 50 | 55:00 | 450 | 99.5 | 6:00 | 425 |
| Ex. 13 | 1000 | 50 | 55:00 | 450 | 100 | 9:25 | 425 |
| Ex. 14 | 1000 | 50 | 27:00 | 450 | 99 | 6:00 | 400 |
| Ex. 15 | 1000 | 50 | 14:00 | 450 | 96 | 5:10 | 450 |
| Ex. 16 | 500 | 98 | 10:00 | 425 | — | — | — |
| Ex. 17 | 500 | 100 | 6:00 | 425 | — | — | — |

TABLE 1-continued

|  | | First chemical strengthening step | | | Second chemical strengthening step | | |
| --- | --- | --- | --- | --- | --- | --- | --- |
|  | Sheet Thickness t [μm] | KNO$_3$ concentration [mass %] | Strengthening time [h:min] | Strengthening temperature [° C.] | KNO$_3$ concentration [mass %] | Strengthening time [h:min] | Strengthening temperature [° C.] |
| Ex. 18 | 500 | 100 | 6:00 | 450 | — | — | — |
| Ex. 19 | 800 | 100 | 6:00 | 425 | — | — | — |
| Ex. 20 | 800 | 100 | 10:00 | 425 | — | — | — |
| Ex. 21 | 800 | 98 | 10:00 | 450 | — | — | — |
| Ex. 22 | 1000 | 100 | 10:00 | 425 | — | — | — |
| Ex. 23 | 1000 | 100 | 7:40 | 450 | — | — | — |
| Ex. 24 | 1000 | 100 | 13:00 | 450 | — | — | — |
| Ex. 25 | 800 | 50 | 130:00 | 450 | 100 | 1:00 | 400 |

The chemically strengthened glasses thus obtained were subjected to various evaluations. The CT value ($CT_1$ value) based on the formula (1) was obtained from the CS value, DOL value and sheet thickness t (unit: μm) obtained from those. The CT value ($CT_5$ value) based on the formula (5) was obtained from the stress distribution and the formula (5). The $CT_{limit}$ value was obtained as $CT_{limit} = -38.7 \times \ln(t/1000) + 48.2$ [MPa] from the sheet thickness t (unit: μm). The results are shown in Table 2.

24. Therefore, it can be said that in the chemically strengthened glass having a stress profile in which triangular approximation can be acceptable, the $CT_5$ value (the upper limit) at which a glass, when broken, begins to finely scatter can be approximated by the $CT_{limit}$ value.

Figure 10:
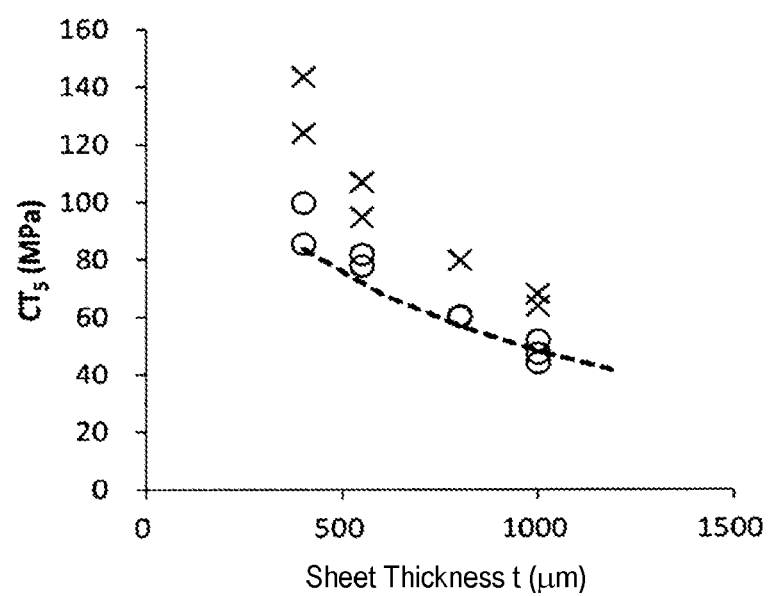
FIG. 10 is a view explaining the relationship between sheet thicknesses of chemically strengthened glasses of Examples 1 to 15 and $CT_5$ value and $CT_{limit}$ value.

It was seen from the results of FIG. 10 that even in the glasses having the $CT_5$ value exceeding the $CT_{limit}$ value, some glasses show small number of fragment when broken. Therefore, in the chemically strengthened glasses having a

TABLE 2

|  | Sheet Thickness t [μm] | CS [MPa] | DOL [μm] | CT$_5$ [MPa] | CT$_1$ [MPa] | CT$_5$/CT$_1$ [—] | HW [μm] | CT$_{limit}$ [MPa] | Number of fragments [Number] |
| --- | --- | --- | --- | --- | --- | --- | --- | --- | --- |
| Ex. 1 | 400 | 954 | 49 | 143.4 | 155.2 | 0.924 | 24.2 | 83.7 | 1504 |
| Ex. 2 | 400 | 954 | 53 | 123.9 | 172.8 | 0.717 | 19.3 | 83.7 | 1592 |
| Ex. 3 | 400 | 702 | 69 | 85.5 | 186.6 | 0.458 | 8.5 | 83.7 | 4 |
| Ex. 4 | 400 | 757 | 52 | 99.8 | 131.7 | 0.758 | 19.7 | 83.7 | 2 |
| Ex. 5 | 550 | 947 | 75 | 81.9 | 176.9 | 0.463 | 14.8 | 71.3 | 4 |
| Ex. 6 | 550 | 991 | 67 | 94.7 | 159.3 | 0.595 | 20.4 | 71.3 | 356 |
| Ex. 7 | 550 | 951 | 63 | 106.9 | 140.7 | 0.760 | 26.0 | 71.3 | 1525 |
| Ex. 8 | 550 | 761 | 77 | 77.9 | 148.4 | 0.525 | 16.3 | 71.3 | 4 |
| Ex. 9 | 800 | 775 | 89 | 60.1 | 111.3 | 0.540 | 22.1 | 56.8 | 4 |
| Ex. 10 | 800 | 775 | 84 | 79.8 | 102.4 | 0.780 | 35.5 | 56.8 | 280 |
| Ex. 11 | 1000 | 954 | 92 | 51.9 | 107.6 | 0.482 | 21.3 | 48.2 | 3 |
| Ex. 12 | 1000 | 984 | 93 | 63.9 | 112.0 | 0.571 | 28.5 | 48.2 | 68 |
| Ex. 13 | 1000 | 946 | 82 | 68.1 | 92.2 | 0.739 | 34.8 | 48.2 | 244 |
| Ex. 14 | 1000 | 971 | 74 | 44.0 | 84.3 | 0.522 | 20.3 | 48.2 | 2 |
| Ex. 15 | 1000 | 784 | 64 | 47.4 | 57.1 | 0.830 | 29.7 | 48.2 | 2 |
| Ex. 16 | 500 | 916 | 34 | 65.9 | 71.2 | 0.925 | 15.2 | 75.0 | 4 |
| Ex. 17 | 500 | 1112 | 31 | 74.0 | 79.7 | 0.929 | 14.0 | 75.0 | 90 |
| Ex. 18 | 500 | 1046 | 42 | 97.3 | 106.8 | 0.911 | 19.6 | 75.0 | 1820 |
| Ex. 19 | 800 | 1126 | 32 | 44.7 | 48.1 | 0.929 | 14.1 | 56.8 | 2 |
| Ex. 20 | 800 | 1109 | 39 | 54.3 | 59.2 | 0.917 | 17.7 | 56.8 | 128 |
| Ex. 21 | 800 | 903 | 49 | 57.1 | 63.5 | 0.900 | 23.1 | 56.8 | 232 |
| Ex. 22 | 1000 | 1082 | 37 | 39.8 | 43.3 | 0.920 | 16.9 | 48.2 | 2 |
| Ex. 23 | 1000 | 1051 | 46 | 47.8 | 52.8 | 0.906 | 21.3 | 48.2 | 131 |
| Ex. 24 | 1000 | 1027 | 61 | 63.1 | 71.6 | 0.881 | 29.2 | 48.2 | 1024 |
| Ex. 25 | 800 | 1081 | 142 | 60.5 | 293.4 | 0.203 | 6.0 | 56.8 | 3 |

Figure 11:
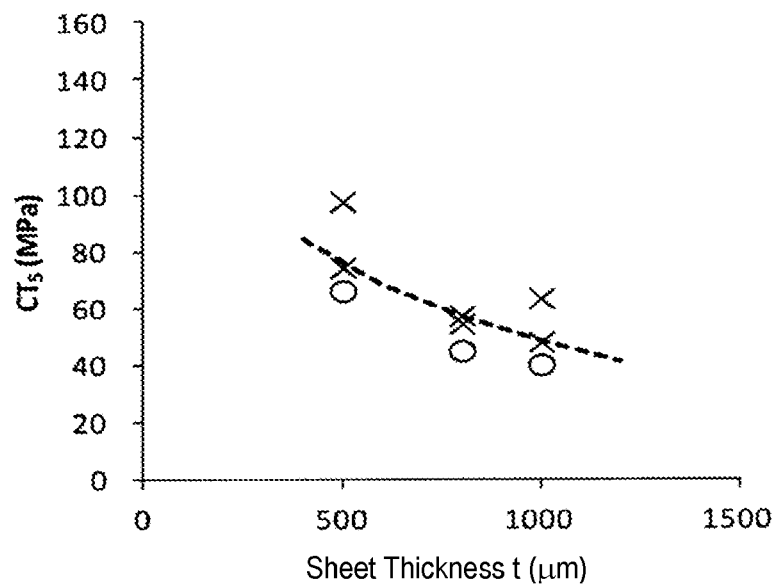
FIG. 11 is a view explaining the relationship between sheet thicknesses of chemically strengthened glasses of Examples 16 to 24 and $CT_5$ value and $CT_{limit}$ value.

Regarding each sample in Table 2, the relationship between the sheet thickness and the $CT_5$ value was plotted. Curve corresponding to the $CT_{limit}$ value was shown. Plots of the samples of Examples 1 to 15 and Example 25 are shown in FIG. 10, and plots of the samples of Examples 16 to 24 are shown in FIG. 11. In FIGS. 10 and 11, the sample in which the number of fragments when fractured was less than 15 was plotted as o and the sample in which the number of fragments was 15 or more was plotted as x.

From the results of FIG. 11, the glasses having the $CT_5$ value exceeding the $CT_{limit}$ value show many number of fragments when fractured in the chemically strengthened glasses having a stress profile in which triangular approximation can be acceptable such that only one chemical strengthening step has been conducted as in Examples 16 to stress profile such that the triangular approximation cannot be acceptable, the $CT_5$ value (the upper limit) at which a glass, when broken, begins to finely scatter greatly differs from the $CT_{limit}$ value that has conventionally been considered as the upper limit. This is a phenomenon that has not been observed in a conventional chemically strengthened glass having a so-called complementary error function profile in which triangular approximation can be relatively acceptable.

It has been further found that when the position becoming half value (HW) of the surface stress value (CS value) is less than 8 μm (Example 25), large CS value and deep DOL value can be achieved and the glass is difficult to finely scatter when broken.

In order to enable controlling cracking behaviors of the chemically strengthened glass regarding the chemically strengthened glass having a stress profile such that triangular approximation cannot be acceptable, the internal rE value was examined in the chemically strengthened glasses of Examples 1 to 24. The internal energy density rE of the chemically strengthened glass is defined by the formula (6) described before. The results are shown in Table 3.

TABLE 3

|  | Sheet Thickness t [μm] | CS [MPa] | DOL [μm] | $CT_5$ [MPa] | rE [kJ/m²] | $rE_{limit}$ [kJ/m²] | Number of fragments [Number] |
|---|---|---|---|---|---|---|---|
| Ex. 1 | 400 | 954 | 49 | 143.4 | 32.7 | 24.3 | 1504 |
| Ex. 2 | 400 | 954 | 53 | 123.9 | 26.7 | 24.3 | 1592 |
| Ex. 3 | 400 | 702 | 69 | 85.5 | 14.6 | 24.3 | 4 |
| Ex. 4 | 400 | 757 | 52 | 99.8 | 22.0 | 24.3 | 2 |
| Ex. 5 | 550 | 947 | 75 | 81.9 | 23.8 | 27.8 | 4 |
| Ex. 6 | 550 | 991 | 67 | 94.7 | 29.8 | 27.8 | 356 |
| Ex. 7 | 550 | 951 | 63 | 106.9 | 34.9 | 27.8 | 1525 |
| Ex. 9 | 800 | 775 | 89 | 60.1 | 29.0 | 33.7 | 4 |
| Ex. 10 | 800 | 775 | 84 | 79.8 | 39.9 | 33.7 | 280 |
| Ex. 8 | 550 | 761 | 77 | 77.9 | 22.2 | 27.8 | 4 |
| Ex. 11 | 1000 | 954 | 92 | 51.9 | 34.5 | 38.3 | 3 |
| Ex. 12 | 1000 | 984 | 93 | 63.9 | 42.4 | 38.3 | 68 |
| Ex. 13 | 1000 | 946 | 82 | 68.1 | 47.7 | 38.3 | 244 |
| Ex. 14 | 1000 | 971 | 74 | 44.0 | 31.9 | 38.3 | 2 |
| Ex. 15 | 1000 | 784 | 64 | 47.4 | 36.1 | 38.3 | 2 |
| Ex. 16 | 500 | 916 | 34 | 65.9 | 24.7 | 26.7 | 4 |
| Ex. 17 | 500 | 1112 | 31 | 74.0 | 28.3 | 26.7 | 90 |
| Ex. 18 | 500 | 1046 | 42 | 97.3 | 33.6 | 26.7 | 1820 |
| Ex. 19 | 800 | 1126 | 32 | 44.7 | 30.3 | 33.7 | 2 |
| Ex. 20 | 800 | 1109 | 39 | 54.3 | 35.5 | 33.7 | 128 |
| Ex. 21 | 800 | 903 | 49 | 57.1 | 35.1 | 33.7 | 232 |
| Ex. 22 | 1000 | 1082 | 37 | 39.8 | 34.1 | 38.3 | 2 |
| Ex. 23 | 1000 | 1051 | 46 | 47.8 | 39.5 | 38.3 | 131 |
| Ex. 24 | 1000 | 1027 | 61 | 63.1 | 48.6 | 38.3 | 1024 |
| Ex. 25 | 800 | 1081 | 142 | 60.5 | 20.1 | 33.7 | 3 |

Figure 12:
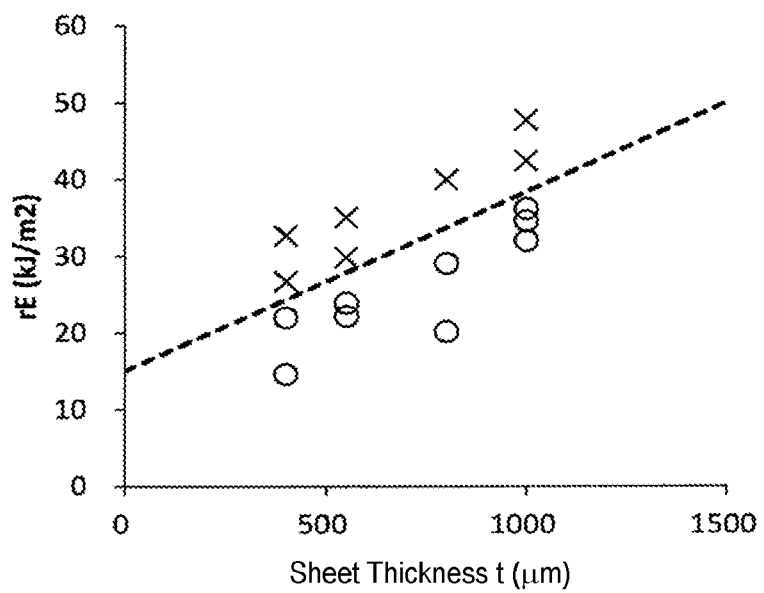
FIG. 12 is a view explaining the relationship between chemically strengthened glasses of Examples 1 to 15 and $rE_{limit}$ value.
Figure 13:
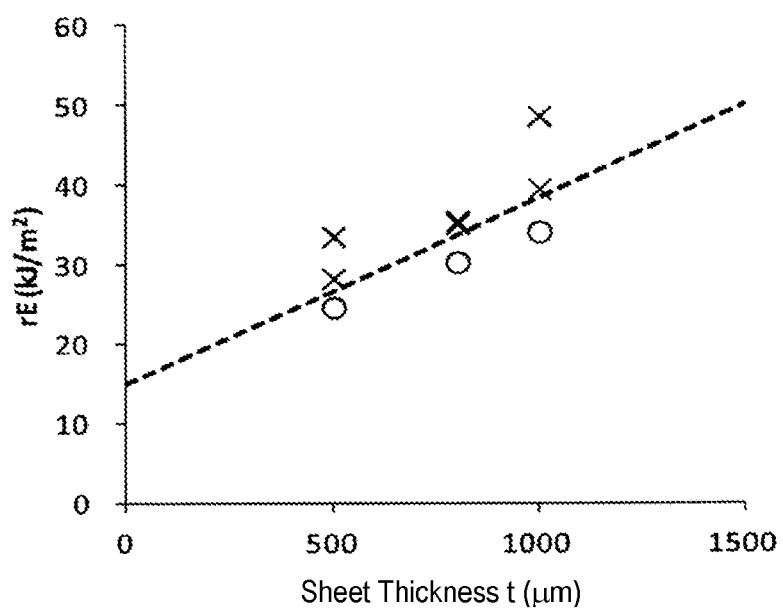
FIG. 13 is a view explaining the relationship between chemically strengthened glasses of Examples 16 to 24 and $rE_{limit}$ value.

Regarding each sample in Table 3, the values of the internal energy density rE of the chemically strengthened glasses of Examples 1 to 25 were plotted in FIGS. 12 and 13. The plots of the samples of Examples 1 to 15 and Example 25 are shown in FIG. 12, and the plots of the samples of Examples 16 to 24 are shown in FIG. 13. In FIGS. 12 and 13, similar to FIGS. 10 and 11, the sample in which the number of fragments when fractured was less than 15 was plotted as o, and the sample in which the number of fragments was 15 or more was plotted as x.

It was seen from the results of FIGS. 12 and 13 that when the internal energy density rE of the chemically strengthened glass exceeds a certain critical value, the number of fragments increases when the glass has broken. The numerical values corresponding to the critical values can be connected by a straight line, and as shown in FIGS. 12 and 13, in the chemically strengthened glasses having the internal energy density exceeding $23.3 \times t/1000+15$ [kJ/m²] in the function of a sheet thickness, the number of fragments increases. Therefore, in the present description, the upper limit of the internal energy density rE was defined as $rE_{limit} = 23.3 \times t/1000+15$ [kJ/m²]. When the internal energy density rE satisfies the formula (7), the glass is difficult to finely scatter when the glass has broken and this is preferred. This condition is the upper limit of the internal energy density rE value of the chemically strengthened glass that has been found as a result of extensive and intensive investigations by the inventors of the present application. As is seen from FIG. 12, the upper limit can also be applicable to a chemically strengthened glass that does not have a so-called complementary error function profile.

From the results, cracking behaviors of the chemically strengthened glass can be controlled by controlling the internal energy density rE within the numerical range satisfying the formula (7) even in a chemically strengthened glass having any stress profile.

The preferred embodiment and Examples are described in detail above, but the invention is not limited to the embodiment and Examples described above, and various modifications and substitutions can be added to the embodiment and Examples described above without deviating the scope described in the claims. Furthermore, the above embodiments can be appropriately combined.

While the present invention has been described in detail and with reference to specific embodiments thereof, it will be apparent to one skilled in the art that various changes and modifications can be made therein without departing from the spirit and scope of the present invention.

DESCRIPTION OF REFERENCE NUMERALS AND SIGNS

1 Surface stress measuring apparatus
10 Light source
20 Light supply member
30 Light extraction member
40 Light conversion member
50 Polarizing member
60 Imaging element
70 Operation part
100 Vickers hardness tester
110 Indenter
111 Tip
200 Chemically strengthened glass
210 Surface of chemically strengthened glass

The invention claimed is:
1. A chemically strengthened glass, wherein:
a $CT_1$ obtained by formula (1) and an internal tensile stress $CT_5$ obtained by formula (5) satisfy $CT_5/CT_1 \leq 0.85$;

the internal tensile stress $CT_5$ is 30 MPa or more;
a compressive stress value at a depth of a half value of a compressive stress depth DOL from a surface of the chemically strengthened glass is 10% or less of a surface compressive stress CS;
a sheet thickness of the chemically strengthened glass is 1000 μm or less; and
when the sheet thickness of the chemically strengthened glass is t (μm),
the $CT_1$ satisfies $CT_1 > -38.7 \times \ln(t/1000) + 48.2$ [MPa] and an internal energy density rE obtained by formula (6) satisfies $rE \leq 23.3 \times t/1000 + 15$ [kJ/m²]:

$$CT_1 = \frac{CS \times DOL}{(t - 2 \times DOL)} \quad (1)$$

$$CT_5 = \frac{2 \times \int_0^{DOL} \sigma(x)dx}{(t - 2 \times DOL)} \quad (5)$$

$$rE = \frac{CT_5 \times (t - 2 \times DOL)^2}{1000 \times t} \quad (6)$$

wherein
CS is a surface compressive stress value [MPa] of the chemically strengthened glass,
σ(x) is a compressive stress value [MPa] at a position x in a depth direction from the surface of the chemically strengthened glass,
DOL is a compressive stress depth [μm] of the chemically strengthened glass, and
t is a sheet thickness [μm] of the chemically strengthened glass.

2. The chemically strengthened glass according to claim 1, wherein a position having a compressive stress being a half value of the surface compressive stress CS is a position less than 8 μm from the surface of the chemically strengthened glass.

3. The chemically strengthened glass according to claim 2, wherein the internal tensile stress $CT_5$ satisfies $CT_5 > -38.7 \times \ln(t/1000) + 48.2$ [MPa].

4. The chemically strengthened glass according to claim 2, wherein the internal tensile stress $CT_5$ [MPa] is 1.1 times or more a $CT_{limit}$ value [MPa] obtained by formula (2):

$$CT_{limit} = -38.7 \times \ln(t/1000) + 48.2 \quad (2),$$

wherein t is the sheet thickness [μm] of the chemically strengthened glass.

5. The chemically strengthened glass according to claim 2, wherein the internal tensile stress $CT_5$ [MPa] is 1.2 times or more a $CT_{limit}$ value [MPa] obtained by formula (2):

$$CT_{limit} = 38.7 \times \ln(t/1000) + 48.2 \quad (2),$$

wherein t is the sheet thickness [μm] of the chemically strengthened glass.

6. The chemically strengthened glass according to claim 2, wherein the internal tensile stress $CT_5$ [MPa] is 1.1 times or more a $CT_{limit}$ value [MPa] obtained by formula (4):

$$CT_{limit} = -36.7 \times \ln(t/1000) + 48.7 \quad (4),$$

wherein t is the sheet thickness [μm] of the chemically strengthened glass.

7. The chemically strengthened glass according to claim 2, wherein the internal tensile stress $CT_5$ [MPa] is 1.2 times or more a $CT_{limit}$ value [MPa] obtained by formula (4):

$$CT_{limit} = -36.7 \times \ln(t/1000) + 48.7 \quad (4),$$

wherein t is the sheet thickness [μm] of the chemically strengthened glass.

8. A chemically strengthened glass, wherein:
a $CT_1$ obtained by formula (1) and an internal tensile stress $CT_5$ obtained by formula (5) satisfy $CT_5/CT_1 \leq 0.85$;
the internal tensile stress $CT_5$ is 30 MPa or more;
a compressive stress value at a depth of a half value of a compressive stress depth DOL from a surface of the chemically strengthened glass is 10% or less of a surface compressive stress CS;
a sheet thickness of the chemically strengthened glass is 1000 μm or less; and
when the sheet thickness of the chemically strengthened glass is t (μm),
the $CT_1$ satisfies $CT_1 > -38.7 \times \ln(t/1000) + 48.2$ [MPa] and an internal energy density rE obtained by formula (6) satisfies $rE \leq 23.3 \times t/1000 + 15$ [kJ/m²]:

$$CT_1 = \frac{CS \times DOL}{(t - 2 \times DOL)} \quad (1)$$

$$CT_5 = \frac{2 \times \int_0^{DOL} \sigma(x)dx}{(t - 2 \times DOL)} \quad (5)$$

$$rE = \frac{CT_5 \times (t - 2 \times DOL)^2}{1000 \times t} \quad (6)$$

wherein
CS is a surface compressive stress value [MPa] of the chemically strengthened glass,
σ(x) is a compressive stress value [MPa] at a position x in a depth direction from the surface of the chemically strengthened glass,
DOL is a compressive stress depth [μm] of the chemically strengthened glass, and
t is a sheet thickness [μm] of the chemically strengthened glass.

9. The chemically strengthened glass according to claim 8, wherein a position having a compressive stress being a half value of the surface compressive stress CS is a position less than 8 μm from the surface of the chemically strengthened glass.

10. The chemically strengthened glass according to claim 9, wherein the internal tensile stress $CT_5$ satisfies $CT_5 > -38.7 \times \ln(t/1000) + 48.2$ [MPa].

11. The chemically strengthened glass according to claim 9, wherein the internal tensile stress $CT_5$ [MPa] is 1.1 times or more a $CT_{limit}$ value [MPa] obtained by formula (2):

$$CT_{limit} = -38.7 \times \ln(t/1000) + 48.2 \quad (2),$$

wherein t is the sheet thickness [μm] of the chemically strengthened glass.

12. The chemically strengthened glass according to claim 9, wherein the internal tensile stress $CT_5$ [MPa] is 1.2 times or more a $CT_{limit}$ value [MPa] obtained by formula (2):

$$CT_{limit} = -38.7 \times \ln(t/1000) + 48.2 \quad (2),$$

wherein t is the sheet thickness [μm] of the chemically strengthened glass.

13. The chemically strengthened glass according to claim 9, wherein the internal tensile stress CT5 [MPa] is 1.1 times or more a $CT_{limit}$ value [MPa] obtained by formula (4):

$$CT_{limit} = -36.7 \times \ln(t/1000) + 48.7 \quad (4),$$

wherein t is the sheet thickness [μm] of the chemically strengthened glass.

14. The chemically strengthened glass according to claim 9, wherein the internal tensile stress CT5 [MPa] is 1.2 times or more a $CT_{limit}$ value [MPa] obtained by formula (4):

$$CT_{limit} = -36.7 \times \ln(t/1000) + 48.7 \qquad (4),$$

wherein t is the sheet thickness [μm] of the chemically strengthened glass.

15. A chemically strengthened glass, wherein:
a $CT_1$ obtained by formula (1) and an internal tensile stress $CT_5$ obtained by formula (5) satisfy $CT_5/CT_1 \leq 0.85$;
the internal tensile stress $CT_5$ is 30 MPa or more;
a compressive stress value at a depth of a half value of a compressive stress depth DOL from a surface of the chemically strengthened glass is 10% or less of a surface compressive stress CS;
a sheet thickness of the chemically strengthened glass is 1000 μm or less; and
when the sheet thickness of the chemically strengthened glass is t (μm),
the $CT_1$ satisfies $CT_1 > -38.7 \times \ln(t/1000) + 48.2$ [MPa] and an internal energy density rE obtained by formula (6) satisfies $rE \leq 23.3 \times t/1000 + 15$ [kJ/m²]:

$$CT_1 = \frac{CS \times DOL}{(t - 2 \times DOL)} \qquad (1)$$

$$CT_5 = \frac{2 \times \int_0^{DOL} \sigma(x)dx}{(t - 2 \times DOL)} \qquad (5)$$

$$rE = \frac{CT_5 \times (t - 2 \times DOL)^2}{1000 \times t} \qquad (6)$$

wherein
CS is a surface compressive stress value [MPa] of the chemically strengthened glass,
σ(x) is a compressive stress value [MPa] at a position x in a depth direction from the surface of the chemically strengthened glass,
DOL is a compressive stress depth [μm] of the chemically strengthened glass, and
t is a sheet thickness [μm] of the chemically strengthened glass.

16. The chemically strengthened glass according to claim 15, wherein a position having a compressive stress being a half value of the surface compressive stress CS is a position less than 8 μm from the surface of the chemically strengthened glass.

17. The chemically strengthened glass according to claim 16, wherein the internal tensile stress $CT_5$ satisfies $CT_5 > -38.7 \times \ln(t/1000) + 48.2$ [MPa].

18. The chemically strengthened glass according to claim 16, wherein the internal tensile stress $CT_5$ [MPa] is 1.1 times or more a $CT_{limit}$ value [MPa] obtained by formula (2):

$$CT_{limit} = -38.7 \times \ln(t/1000) + 48.2 \qquad (2),$$

wherein t is the sheet thickness [μm] of the chemically strengthened glass.

19. The chemically strengthened glass according to claim 16, wherein the internal tensile stress $CT_5$ [MPa] is 1.2 times or more a $CT_{limit}$ value [MPa] obtained by formula (2):

$$CT_{limit} = -38.7 \times \ln(t/1000) + 48.2 \qquad (2),$$

wherein t is the sheet thickness [μm] of the chemically strengthened glass.

20. The chemically strengthened glass according to claim 16, wherein the internal tensile stress $CT_5$ [MPa] is 1.1 times or more a $CT_{limit}$ value [MPa] obtained by formula (4):

$$CT_{limit} = -36.7 \times \ln(t/1000) + 48.7 \qquad (4),$$

wherein t is the sheet thickness [μm] of the chemically strengthened glass.

21. The chemically strengthened glass according to claim 16, wherein the internal tensile stress $CT_5$ [MPa] is 1.2 times or more a $CT_{limit}$ value [MPa] obtained by formula (4):

$$CT_{limit} = -36.7 \times \ln(t/1000) + 48.7 \qquad (4),$$

wherein t is the sheet thickness [μm] of the chemically strengthened glass.

* * * * *